United States Patent [19]
Casperson

[11] 3,940,711
[45] Feb. 24, 1976

[54] CYLINDRICAL LASER RESONATOR

[75] Inventor: Lee W. Casperson, Los Angeles, Calif.

[73] Assignee: The United States of America as represented by the United States Energy Research and Development Administration, Washington, D.C.

[22] Filed: Mar. 21, 1974

[21] Appl. No.: 453,603

[52] U.S. Cl. ......................................... 331/94.5 C
[51] Int. Cl.² ...................................... H01S 3/082
[58] Field of Search ................................ 331/94.5

[56] References Cited
UNITED STATES PATENTS

| | | | |
|---|---|---|---|
| 3,140,451 | 7/1964 | Fox | 331/94.5 C |
| 3,222,615 | 12/1965 | Holly | 331/94.5 P |
| 3,241,085 | 3/1966 | Marcatili | 331/94.5 C |
| 3,739,296 | 6/1973 | Beiser | 331/94.5 C |

OTHER PUBLICATIONS

Casperson, Cylindrical Laser Resonators, JOSA, Vol. 63, No. 1 (Jan. 1973), pp. 25-29.
Casperson et al., Properties of a Radial Mode $CO_2$ Laser, IEEE J. Quant Elect., Vol. QE-9, No. 4 (Apr. 1973), pp. 484-488.

*Primary Examiner*—William L. Sikes
*Attorney, Agent, or Firm*—Dean E. Carlson; Robert J. Marchick

[57] ABSTRACT

The properties of an improved class of lasers is presented. In one configuration of these lasers the radiation propagates radially within the amplifying medium, resulting in high fields and symmetric illumination at the resonator axis. Thus there is a strong focusing of energy at the axis of the resonator. In a second configuration the radiation propagates back and forth in a tubular region of space.

1 Claim, 7 Drawing Figures

CYLINDRICAL LASER RESONATOR

BACKGROUND OF THE INVENTION

This invention relates to devices for generating and amplifying electromagnetic wave energy and, in particular, to laser oscillators and amplifiers. Most conventional laser resonators consist of a pair of mirrors, for example a Fabry-Perot interferometer, between which electromagnetic radiation may be made to propagate. Within this optical cavity, an amplifying medium, and perhaps a variety of other optical elements is placed.

SUMMARY OF THE INVENTION

Accordingly, it is an object of the present invention to increase the power output of a laser by shaping the reflector defining the laser cavity into a cylindrical configuration so that the radiation propagates in the radial direction toward and away from the axis of symmetry. The waves themselves are approximately cylindrical waves as defined by Hankel functions except for a slight curvature of the phase fronts in the z direction.

It is a further object of this invention to increase the power output of laser oscillators and amplifiers by more efficiently utilizing the laser materials. Among the more important properties of these new lasers are the high fields and uniform illumination at the laser axis.

It is a further object of this invention to present a related class of conical and tubular resonators which also have advantages of compactness and efficiency.

DESCRIPTION OF THE PREFERRED EMBODIMENT

Figure 1:
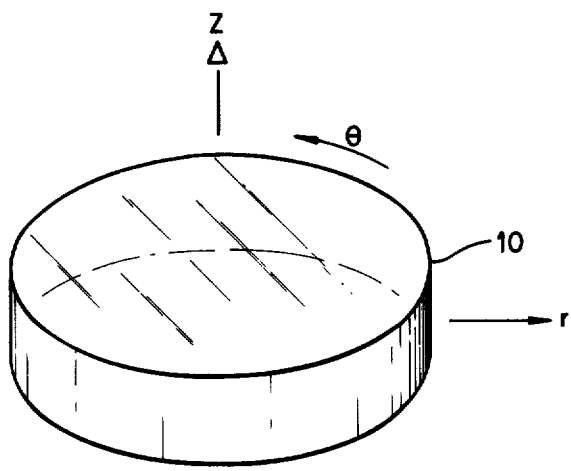
FIG. 1 presents a diagram of a cylindrical laser resonator.
Figure 2:
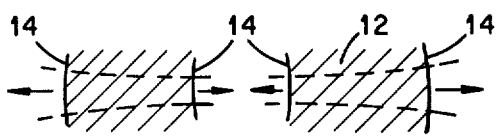
FIG. 2 presents a vertical cross section through a disk mode cylindrical resonator.
Figure 4:
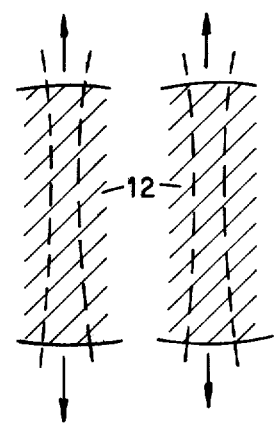
FIG. 4 presents a vertical cross section through the tube mode of the cylindrical resonator.
Figure 3:
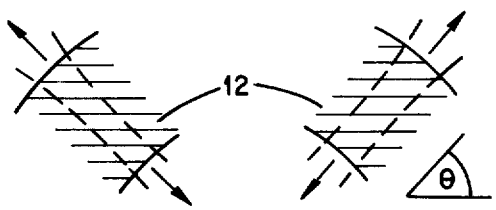
FIG. 3 presents a vertical cross section through the cone mode resonator.

FIG. 1 presents the simplest possible cylindrical resonator consisting of one wrap around mirror 10. The mirror shown has a slight curvature in the z direction which can be useful for reducing diffraction. The radiation in this cavity would reflect back and forth between the mirror and the axis. FIG. 2 presents a vertical cross section through the middle of a resonator. The shaded area 12 indicates the amplifying medium. The solid lines 14 indicate mirrors and the arrows show the direction of the output beams. The disk resonator of FIG. 2 is the same as that of FIG. 1 except that an additional concentric mirror has been added so that the laser output may be taken from the center of the resonator as well as through the outside mirror. FIG. 3 shows a cone resonator with an angle $\theta$ between the cone surface and the horizontal plane. FIG. 4 shows a tube resonator. The disk and tube configurations are limiting forms of the cone resonator. In the disk laser the radiation propagates only in the radial direction. These disk lasers are not to be confused with other conventional lasers that have radiation propagating across the plane of a disk shaped amplifying medium.

Figure 5:
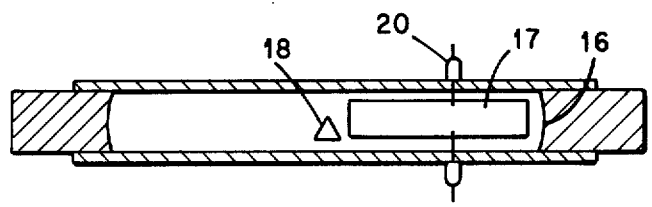
FIG. 5 presents a cross-sectional view of a $CO_2$ TEA radial mode laser.

An important feature of the disk lasers is the high energy density that is obtained at the axis. Referring to FIG. 5 there is presented a $CO_2$ laser utilizing the cylindrical resonator of the subject invention. The primary mirror 16 is constructed of aluminum with an inner diameter of 36 cm. and a radius of curvature in the z direction of 23 cm. This configuration gives reasonably good focusing in the z direction at the resonator axis without sacrificing stability or making fabrication overly difficult. The aperture 17 provides selection of the transverse modes. The output beam is coupled from the resonator by means of a small mirror 18 in the shape of a truncated cone. This mirror skims a part of the power from the laser mode and reflects that power out through a hole at the top of the laser. This skimming is analogous to hole coupling in conventional lasers. A more efficient coupling is possible by using an inner concentric mirror that is partially transmissive.

Figure 7:
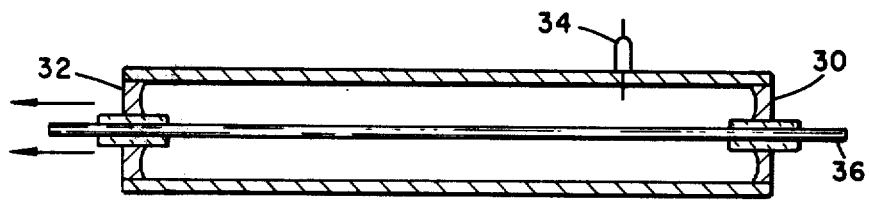
FIG. 7 presents a cross-sectional view of $CO_2$ TEA tubular mode laser.

Referring to FIG. 7 there is presented a $CO_2$ laser utilizing the tube resonator of the subject invention. Acceptable mirror dimensions for a working model would be an outer diameter of 8 cm., an inner diameter of 2 cm., and a separation of 1 m. This radius of curvature of the mirrors in the radial direction is 1 m. One mirror 30 is highly reflecting and may be machined and polished from aluminum. The other mirror 32 provides the output beam and is made of a suitable partially transmitting material such as germanium or NaCl.

Figure 6:
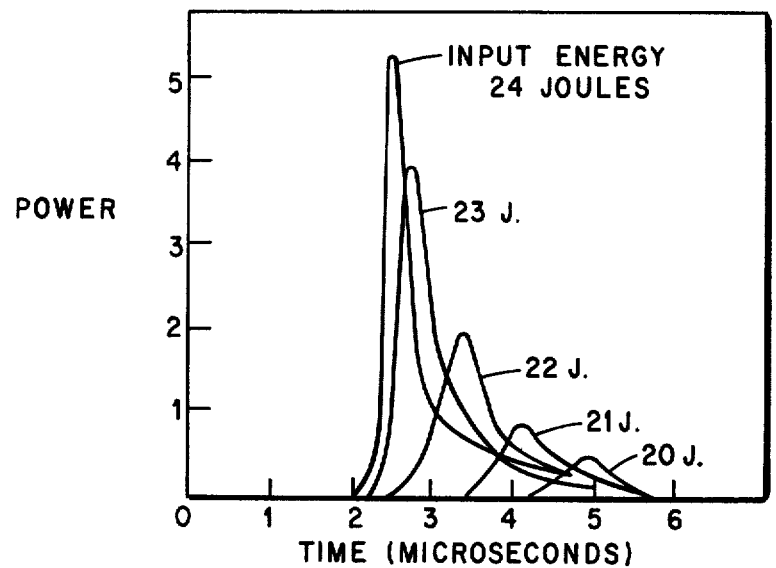
FIG. 6 presents a plot of the power versus time for various input energies.

The amplifying medium may consist of a flowing mixture of $CO_2$, He and $N_2$ (7 %, 88 %, 5 % respectively), at atmospheric pressure, excited transversely to the laser plane in the disk configuration of FIG. 5. Resistive pin discharges take place between a number of close-packed resistors 20 on the top side of the laser and an equal number of resistors positioned directly below on the bottom side. In the preferred embodiment 1740 resistors of 470 ohms, 1 watt value on each side of the laser have been found satisfactory. The current pulse has a width at half maximum of less than 0.5 microseconds. FIG. 6 consists of plots of the laser output power versus time from the beginning of the discharge for various values of input energy. The laser here was operating close to threshold and it is in this regime that many of the significant properties of the laser are most easily studied. The curves in FIG. 6 show a uniform increase in power output and a decrease in delay as the input energy is systematically increased from about 20 to 24 joules. This behavior has been found to agree well with a rate equation model for giant pulsing in conventional lasers.

The time delay variations shown in FIG. 6 can also be interpreted in terms of a simple model. It has been shown experimentally that in a typical resistive pin TEA laser the gain rises exponentially to its maximum value after a time of about 1 microsecond. Thus there is an initial delay $T_0$ before the laser reaches threshold. This delay may be regarded as nearly constant for the narrow range of input energies appropriate to FIG. 6. There is also a second delay due to the time required for the optical fields to develop from spontaneous emission.

In the tube configuration of FIG. 7, resistive pin discharges take place between a number of close-packed resistors 34 on the outside of the laser and a conducting electrode 36 at the axis. Besides these resistive pin methods many other laser media and pumping techniques would also be appropriate for use in the new resonators of the present invention.

Among the novel features obtained utilizing the geometry of the subject laser are an extremely high field strength at the laser axis of the disk configuration. The low order Hankel function fields grow as $1/\sqrt{r}$ to within about one wavelength of the axis. Therefore, the entire output of the laser sketched in FIG. 2 may be regarded as being incident on a cylinder of about a wavelength diameter surrounding the axis. The focusing is better than can be obtained with conventional lasers and lenses. Further, the configuration of the present invention provides for uniform illumination. When an ordinary laser is focused on an object only one side of the object can be illuminated. However, an object at the axis of a cylindrical laser like that shown in FIG. 3 would be illuminated uniformly from all sides. The output beam through the outside mirror of a cylindrical laser like that shown in FIG. 1 is essentially planar in form. The beam structure has a simple mathematical description. A planar beam could also be obtained by illuminating a concial mirror with the output of a conventional laser but the beam structure would be much more complicated.

Because the active medium in cylindrical laser is confined more or less to a disk shaped region rather than to a long, narrow region, the largest dimension of a cylindrical laser is much less than the size of a conventional laser having the same output. In particular if the thickness of the disk is made comparable to the thickness of a conventional laser of similar output, then the disk radius need only be equal to about the square root of the product of thickness and length of the conventional laser. For example, a conventional laser of 1 cm. thickness and 100 cm. length could be replaced by a cylindrical laser of 1 cm. thickness and about 10 cm. radius.

The concentrated power output and uniform illumination at the axis of a cylindrical resonator are very desirable properties for optical pumping of other laser media. For example, the active medium in the cylindrical laser could be a pulsed nitrogen discharge with an ultraviolet output and an appropriate dye cell at the axis of the resonator would have high-gain for visible radiation propagating along the $z$ axis.

The tube resonator also has advantages of compactness and efficient use of the laser medium. In parallel plate TEA double-discharge lasers it is difficult to prevent edge effects from creating non-uniform fields and arcing. With the tube configuration, on the other hand, edge effects are eliminated and azimuthal symmetry is guaranteed. Also the tube resonator is useful for optically pumped lasers such as dye lasers because the pump lamp can be placed along the axis of the amplifying medium for very efficient pump coupling.

Besides their uses as oscillators these devices may with appropriate coupling be used as compact amplifiers of the electro-magnetic radiation orginating from other lasers.

What is claimed is:

1. In a laser:
a resonant cavity comprising two cylindrical resonators disposed in parallel relation to each other each having partially reflective inner surfaces and separated from each other by a conducting electrode.

* * * * *